US006730186B2

(12) United States Patent
Takahashi

(10) Patent No.: US 6,730,186 B2
(45) Date of Patent: May 4, 2004

(54) COATING FILM TRANSFER TOOL AND METHOD FOR REPLACING COATING FILM TRANSFER TAPES

(75) Inventor: Katsuaki Takahashi, Tokyo (JP)

(73) Assignee: Plus Stationery Corporation (JP)

( * ) Notice: Subject to any disclaimer, the term of this patent is extended or adjusted under 35 U.S.C. 154(b) by 49 days.

(21) Appl. No.: 10/171,979

(22) Filed: Jun. 17, 2002

(65) Prior Publication Data

US 2003/0062135 A1 Apr. 3, 2003

(30) Foreign Application Priority Data

Sep. 28, 2001 (JP) ....................................... 2001-303721

(51) Int. Cl.[7] ................................................ B32B 31/00

(52) U.S. Cl. ........................ 156/238; 156/523; 156/577; 156/579; 118/76; 242/160.4; 242/171; 242/588.6

(58) Field of Search ................................ 156/523, 527, 156/538, 540, 574, 577, 579, 238; 118/76, 200, 257; 225/46; 242/160.2, 160.4, 170, 171, 588, 588.2, 588.3, 588.6

(56) References Cited

U.S. PATENT DOCUMENTS 6,000,455 A * 12/1999 Semmler .................... 156/540

6,599,363 B2 * 7/2003 Narita ......................... 118/76

FOREIGN PATENT DOCUMENTS

JP 9-2724 * 1/1997

* cited by examiner

*Primary Examiner*—Mark A. Osele
(74) *Attorney, Agent, or Firm*—Swidler Berlin Shereff Friedman, LLP

(57) ABSTRACT

An object of the present invention is to provide a coating film transfer tool which is made smaller to provide superior portability and which can implement the replacement of a used up coating film transfer tape with fewer operations. According to the invention, there is provided a coating film transfer tool which can facilitate the replacement of coating film transfer tapes markedly by constructing such that when the main body is divided to be opened for supply of the refill for replacement the head automatically rotates to the tape replacement position, whereas when the main body is closed after the replacement with the refill has been completed the tape is automatically taken up to be wrapped around the distal end portion of the head whereby transfer work becomes possible.

5 Claims, 22 Drawing Sheets

(A)

(B)

COATING FILM TRANSFER TOOL AND METHOD FOR REPLACING COATING FILM TRANSFER TAPES

BACKGROUND OF THE INVENTION

1. Field of the Invention

The present invention relates to the construction of a coating film transfer tool for use in transferring a transfer layer provided on one side of a tape in a strippable state to a coating film receiving surface.

More particularly the present invention relates to the construction of a coating film transfer tool wherein a main body is formed small so that a superior portability is provided and wherein replacement work for a used-up coating film transfer tape is facilitated with as few operations as possible being involved. In addition, the invention relates to the construction of a coating film transfer tool which can contribute to conservation of resources and reduction in the amount of wastes by reducing the number of constituent members which are disposed in association with the replacement of refills.

2. Description of the Related Art

Conventionally, a plurality of coating film transfer tools have been devised for use in transferring repairing paint or an adhesive layer onto the surface of a piece of paper or the like, and as one of those coating film transfer tools a product is marketed in which a main body is formed small and thin.

A product, for instance, illustrated in FIG. 27 can be taken as an example for description. The product represents the construction of a coating film transfer tool disclosed in Japanese Unexamined Patent Publication (Kokai) No. 2001-48414. This coating film transfer tool comprises a supply reel and a take-up reel which are provided in the interior of a main body of the tool in such a manner as to operate in an interlocked fashion, and a disposable type coating film transfer tape is installed in the tool for use. Normally, coating film transfer tools of this disposable type have been dominant in the market place. This is because the coating film transfer tools were originally devised as a portable product, and therefore since they are used less frequently when compared with normal products developed for office use, the disposable type coating film transfer tools can be used for a long time without replacing coating film transfer tapes. However, small coating film transfer tools like this have been so popular that they are used not only as a portable tool but also as a normal office tool since they not only provides superior convenience but also are easy to hold and require no specific place to be accommodated. However, since the amount of coating film transfer tape provided in advance in the tool is limited as a result of miniaturization of the main body, when the tool is used frequently the consumption of the coating film transfer tape increases markedly, and therefore the coating film transfer tape is often used up in the middle of use. Namely, the length of coating film transfer tape provided in the coating film transfer tool for the normal use is in the order of 10 m while the length of coating film transfer tape in the coating film transfer tool for the portable use is in the order of 5 m, and therefore when used equally frequently the coating film transfer tool for the portable use runs out of coating film transfer tape substantially two times faster than the tool for the normal use, this requiring the use to buy products of the former type quite frequently. Due to this, while with the disposable type products, the internal construction of the coating film transfer tool can be made simple and therefore they can be provided at inexpensive production costs, there are produced lots of wastes, causing problems from the viewpoints of conservation of resources and reduction in the amount of wastes to be discharged.

To cope with the problems, in recent years mechanisms have been developed for recycling fully consumed or used up coating film transfer tapes that are removed from the tools to make them reusable, and in reality there have been marketed some products having such a mechanism. Then, it can be considered to adopt the same mechanism in the small coating film transfer tools to attempt at conserving resources and reducing the amount of wastes to be discharged, but with the currently known tape replacing mechanisms there exist the following problems.

Since tape replaceable coating film transfer tools are intended to conserve resources and reduce the amount of wastes to be discharged, it is ideal to replace only the used up coating film transfer tape with a new coating film transfer tape with no other constituent component which are accessory thereto being replaced together with the tape. However, since it is difficult for the user to replace coating film transfer tapes only with ease, in reality some other constituent members are also replaced together with tapes to some extent. When looking carefully at currently marketed products, it is found that in reality quite a number of constituent members are replaced together with coating film transfer tapes when the tapes are replaced.

For example, FIG. 28 shows a refill coating film transfer tape 800 which is disclosed in Japanese unexamined Patent Publication (Kokai) No. 6-286927. To explain specifically with reference to the tape, there have been marketed a number of conventional products adopting a cartridge type coating film transfer tape with a view to facilitating the replacement work of coating film transfer tapes. In the case of such a product, normally replaced are a coating film transfer tape 805, a core 801 of the coating film transfer tape, a take-up reel 802, a holder 803, a transfer head 804 and the like. Here, to observe the operation of the coating film transfer tape, the tape is first supplied, then the coating film is transferred by the head, and the used tape is taken up around the take-up reel, and since the operations are carried out as a series of operations, it is true that in case constituent members associated with the operations are consolidated into a cartridge, the replacement work can be facilitated. However, it is totally a waste to replace many constituent members which function properly together with the used up coating film transfer tape, and such a design can be said as departing from the original object to conserve resources and reduce the amount of wastes to be discharged.

In addition, while there exist among the cartridge type products some products which are simple in construction and hence comprise fewer constituent members, it is often the case with such a product that the replacement work becomes more complicated by an extent to which the number of members to be replaced is reduced.

To cope with this, a technique has been proposed for eliminating the drawbacks inherent in the cartridge type coating film transfer tools.

For instance, an invention such as disclosed in Japanese Unexamined Patent Publication (Kokai) No. 9-2724 is taken for example. As shown in FIG. 29, in a coating film transfer tool according to the invention, a transfer head 900 and an arm 901 for supporting the transfer head 900 are provided in such a manner as to rotate together, and as shown in FIG. 30, a replacement coating film transfer tape 1001 mounted on a holder 1000 can easily be mounted on the tool. Namely, when replacing coating film transfer tapes the head 900 and the arm 901 are rotated to be put in a state shown in FIG. 31, and in this state the replacement coating film transfer tape 1001 fixed to the holder 1000 and a take-up reel 1002 can be mounted on the coating film transfer tool from thereabove. After the tape has been mounted properly, the coating film transfer tape is automatically set relative to the head by rotating the head 900 and the arm 901 in a counterclockwise direction, and at the same time the coating film transfer tape is taken up to eliminate a slack thereon, thus the replacement work being implemented with ease. In many cases, it is the most troublesome to the user with respect to the tape replaceable coating film transfer tool to engage the coating film transfer tape with the head at the time of replacing coating film transfer tapes, but according to the construction of the aforesaid coating film transfer tool, the coating film transfer tape can be hooked on the head in replacing the tapes with no complicate operation by the user being involved. Furthermore, since the tape can also be automatically adjusted to eliminate the slack thereon, the mechanism can be regarded as superior. In addition, in general, as the replacement work of coating film transfer tapes gets easier, the number of constituent members to be replaced tends to increase, and in case only the used up transfer tape is attempted to be replaced while the number of constituent members to be replaced is decreased, the user had to perform troublesome work of manually hooking the coating film transfer tape on the head and thereafter adjusting the take-up reel to eliminate the slack on the tape. However, with the coating film transfer tool according to the cited invention, the necessity of performing such troublesome work is obviated. Furthermore, the members to be replaced are limited to the coating film transfer tape, the take-up reel, the coating film transfer tape core and the holder, and therefore the conservation of resources has been markedly improved when compared with the products in which almost all of the internal mechanism of the coating film transfer tool are intended to be replaced.

Even with the improved product, however, further improvement is possible, and there has been a demand for improvement in which the replacement of coating film transfer tapes can be implemented with a simpler operation while attempting to attain conservation of resources as well as reduction in the amount of wastes to be discharged.

For example, with the conventional techniques including the aforesaid one, the five-stage operation has been required; ① opening the main body case, ② rotating the head and the arm, ③ replacing coating film transfer tapes, ④ returning the head and the arm to the original positions, and ⑤ closing the main bodycase. Although the operation itself becomes less difficult to perform once the user gets used to it, the user still has to feel troublesomeness and there still exists a risk that the user tends to have an unfavorable impression against the product.

Then, the present invention was made in view of the problems inherent in the conventional techniques, and an object thereof is to provide a coating film transfer tool which is made smaller to provide superior portability and which can implement the replacement of a used up coating film transfer tape with fewer operations. In addition, the other object of the invention is to provide a coating film transfer tool which can contribute to the conservation of resources and reduction in the amount of wastes to be discharged by reducing the number of constituent members to be disposed when a refill is supplied to replace the used up coating film transfer tape.

SUMMARY OF THE INVENTION

According to a first aspect of the invention, there is provided a coating film transfer tool for use to transfer a transfer layer provided on a side of a tape in a strippable state to a coating film receiving surface, the coating film transfer tool being characterized in that a head automatically rotates to a tape replacement position when a main body is divided to be opened for supply of a refill for replacement, and in that a coating film transfer tape is automatically taken up to be wrapped around a distal end portion of the head whereby transfer work becomes possible when the main body is closed after the replacement with the refill has been completed.

According to the construction of the first aspect of the invention, when the main body is divided to be opened for supply of the refill for replacement the head automatically rotates to the tape replacement position, whereas when the main body is closed after the replacement with the refill has been completed the tape is automatically taken up to be wrapped around the distal end portion of the head whereby transfer work becomes possible. As a result, the troublesome work that has been carried out manually in the conventional techniques can be eliminated and the replacement work of coating film transfer tapes can be implemented extremely easily. In addition, in replacing coating film transfer tapes, the members that are provided on the main body such as the head, the take-up reel and the supply reel do not have to be replaced but can continue to be used, thereby making it possible to provide the coating film transfer tool that can contribute to the conservation of resources and reduction in the amount of wastes to be discharged.

According to a second aspect of the invention, there is provided a coating film transfer tool as set forth in the first aspect of the invention, wherein a gear portion is provided which is adapted to mesh with a rack provided on one of main body members constituting the main body, and wherein a head retaining body is provided in the interior of the other main body member in such a manner as to be rotatably supported.

According to the construction of the second aspect of the invention, the gear portion is provided which is adapted to mesh with the rack provided on one of the main body members constituting the main body, and the head retaining body is provided in the interior of the other main body member in such a manner as to be rotatably supported. Then, when the main body is divided to be opened to supply of the refill for replacement, the rack and the gear portion provided on the head retaining body come to mesh with each other, whereby the head retaining body rotates. Due to this, in supplying the refill for replacement, when the main body is divided to be opened the head automatically rotates to the tape replacement position whereas when the main body is closed after the replacement with the refill has been completed the tape is automatically taken up to be wrapped around the distal end portion of the head, whereby the replacement work becomes possible. Consequently, the respective members provided in the interior of the main body do not have to be moved individually, thereby making it possible to provide the coating film transfer tool in which the replacement work of coating film transfer tapes can be implemented extremely easily.

According to a third aspect of the invention, there is provided a coating film transfer tool as set forth in the first or second aspect of the invention, wherein the head retaining body automatically moves to a side of a take-up reel so that the coating film transfer tape is disengaged from the head when the main body is divided to be opened for supply of a refill for replacement whereas the head retaining body automatically rotates in a reverse direction so that the coating film transfer tape is engaged with the head when the divided main body is closed, and wherein the coating film transfer tape is drawn out as the head retaining body so rotates, whereby the slack of the coating film transfer tape is removed.

According to the construction of the third aspect of the invention, when the main body is divided to be opened in supplying the refill for replacement, the head retaining body rotates and, the head automatically moves to the side of the take-up reel so as to be disengaged from the coating film transfer tape. In addition, when the divided main body is closed the head retaining body automatically rotates in the reverse direction whereby the tape is hooked on the head, and the coating film transfer tape is then drawn out to eliminate the slack on the tape. Consequently, the respective members provided in the interior of the main body do not have to be moved individually, thereby making it possible to provide the coating film transfer tool in which the replacement work of coating film transfer tapes can be implemented extremely easily.

According to a fourth aspect of the invention, there is provided a method for replacing coating film transfer tapes for use in a coating film transfer tool for use to transfer a transfer layer provided on a side of a tape in a strippable state to a coating film receiving surface, the coating film transfer tool being constructed such that a head automatically rotates to a tape replacement position when a main body is divided to be opened for supply of a refill for replacement and that a coating film transfer tape is automatically wrapped around a distal end portion of the head whereby transfer work becomes possible when the main body is closed after the replacement with the refill has been completed, the method comprising the operations of dividing the main body to open it for removing a coating film transfer tape that has been used up, mounting a refill coating film transfer tape on a supply reel and a take-up reel after the used-up coating film transfer tape has been removed, and closing the divided main body.

According to the construction of the fourth aspect of the invention, when the main body is divided to be opened for supply of the refill for replacement the head automatically rotates the tape replacement position whereas when the main body is closed after the replacement with the refill has been completed the tape is automatically taken up to be wrapped around the distal end portion of the head whereby the transfer work becomes possible. Consequently, the replacement of coating film transfer tapes can be implemented simply through the operations of dividing the main body to open it for removing the used up coating film transfer tape, mounting the refill coating film transfer tape on the supply reel and the take-up reel after the used up coating film transfer tape has been removed and closing the divided main body.

The present invention is constructed such that when the main body is divided to be opened for supply of the refill for replacement the head automatically rotates to the tape replacement position whereas when the main body is closed after the replacement with the refill has been completed the tape is automatically taken up to be wrapped around the distal end of the head whereby transfer work becomes possible. According to this construction, there is provided a coating film transfer tool which can eliminate the troublesome work that has been carried out manually in the conventional techniques and implement extremely easily the replacement work of coating film transfer tapes. In addition, there is also provided a coating film transfer tool which can contribute to the conservation of resources and reduction in the amount of wastes to be discharged by allowing the members that are provided on the main body such as the head, the take-up reel and the supply reel to continue to be used without having to be replaced in replacing coating film transfer tapes.

BRIEF DESCRIPTION OF THE DRAWINGS

The invention will be better understood from reading the description which will follow, which is given merely by way of example and made with reference to the appended drawings, in which.

DETAILED DESCRIPTION OF THE INVENTION

Referring to the appended drawings, an embodiment according to the invention will be described in detail below.

Figure 1:
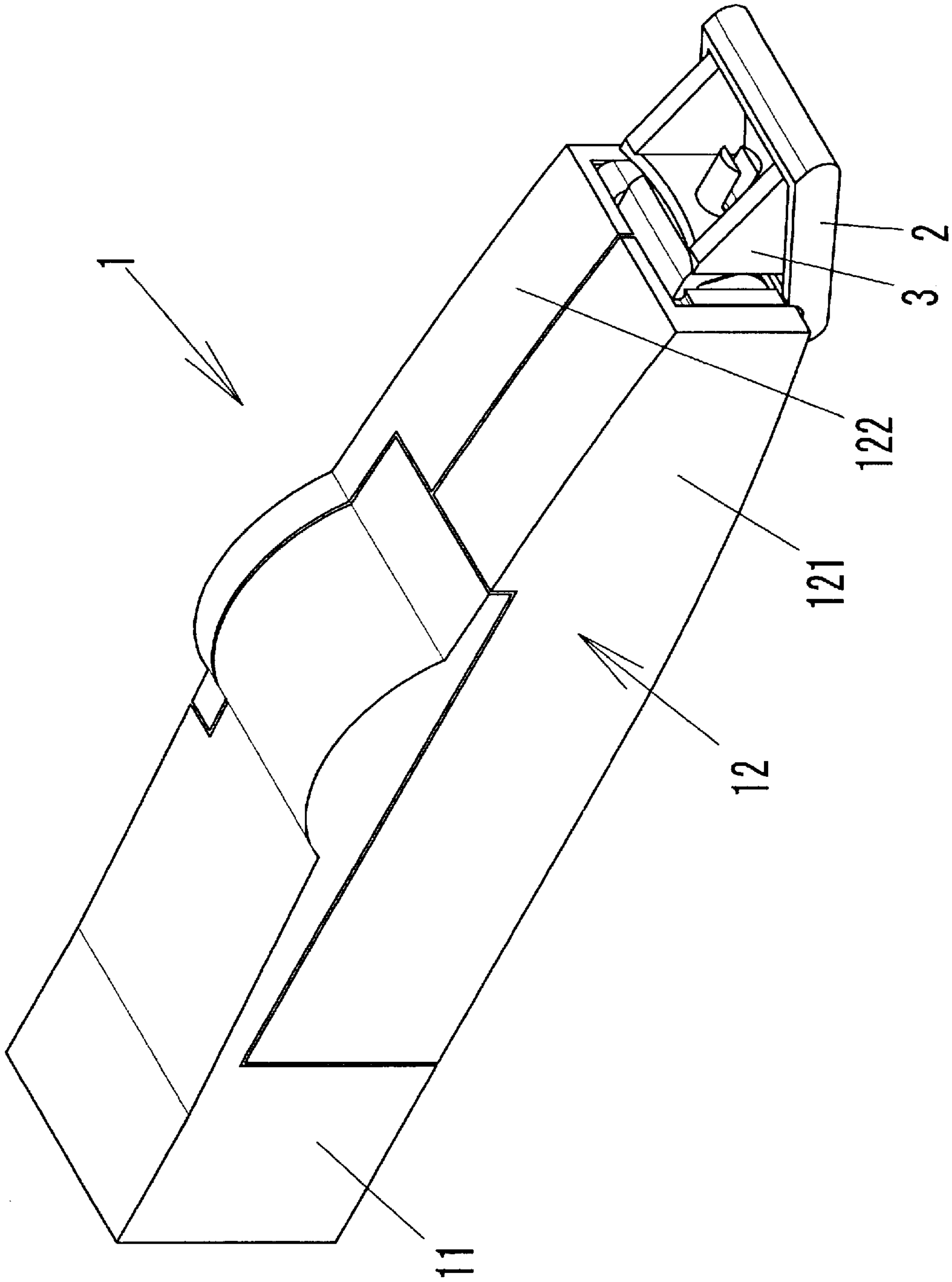
FIG. 1 is a perspective view showing the external appearance of an embodiment of a coating film transfer tool according to the invention.

FIG. 1 shows a construction for a coating film transfer tool according to the invention.

Figure 2:
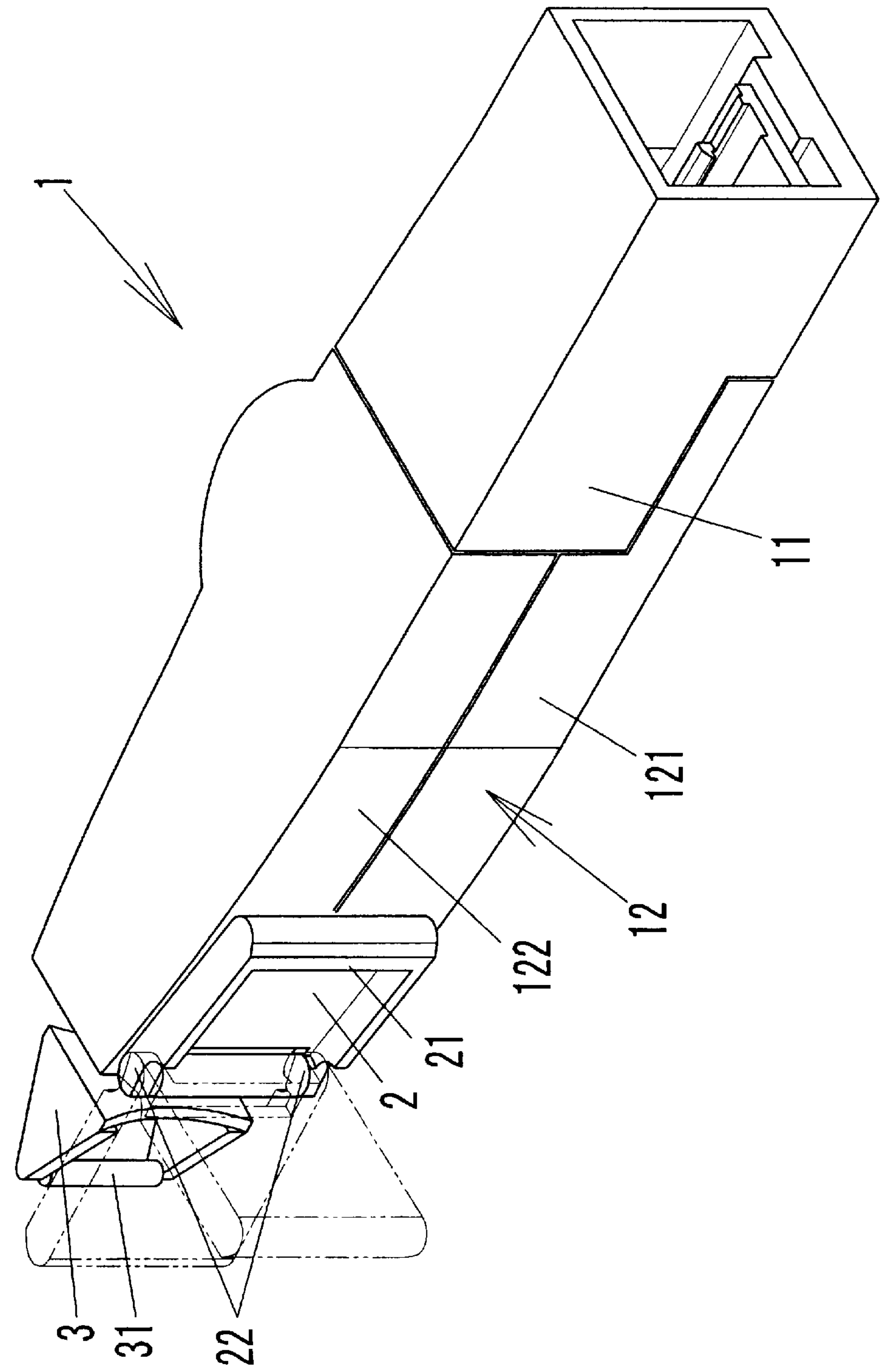
FIG. 2 is a perspective view showing a state in which the coating film transfer tool according to the invention is viewed at a different angle from that at which the coating film transfer tool is viewed in FIG. 1.

FIG. 2 shows a state in which the coating film transfer tool shown in FIG. 1 is viewed at an angle which is different from that at which the tool is viewed in FIG. 1.

A main body 1 of the coating film transfer tool comprises a first case 11, a second case 12 and a cap 2 of a head 3, which are all made from resin material, and the first case 11 and the second case 12 are coupled together in a state in which they can be divided from each other. In addition, the cap 2 for protecting the head 3 is rotatably supported about a support portion 22. A locking portion 21 is formed on an edge portion of the cap 2 so that the locking portion 21 locks onto the head 3 when the cap 2 is closed.

Next, the internal construction of the main body 1 of the coating film transfer tool will be described with reference to FIG. 3.

Figure 3:
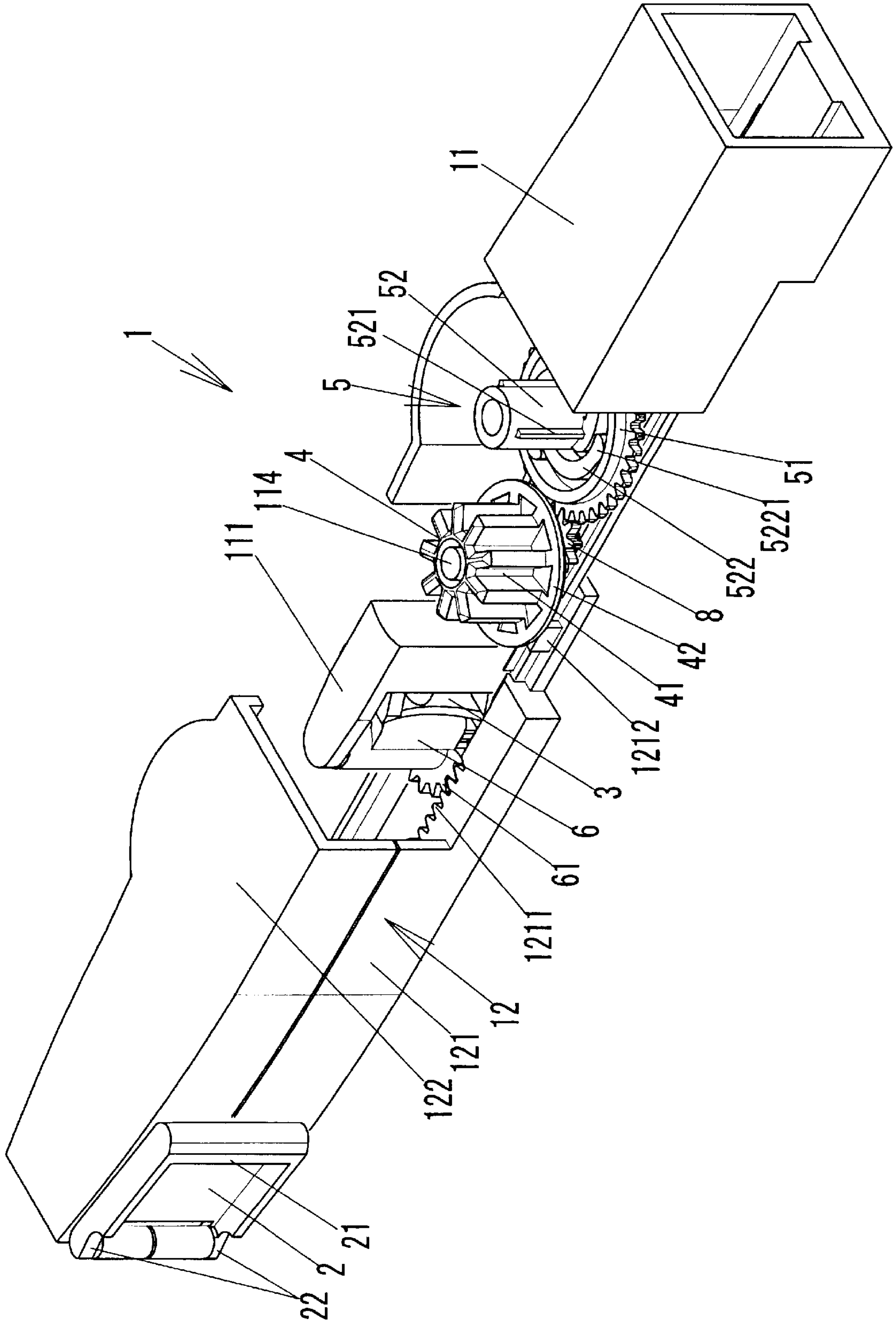
FIG. 3 is a perspective view showing a state in which a first case and a second case are opened, the first case and the second case being provided on the coating film transfer tool shown in FIG. 1.

FIG. 3 shows a state in which the main body 1 of the coating film transfer tool shown in FIGS. 1 and 2 is opened.

Provided in the interior of the main body 1 are a head retaining body 6, the head 3, a take-up reel 4, a supply reel 5 and a middle gear 8. In this state, the take-up reel 4 and the supply reel 5 mesh with each other via the middle gear 8, and a gear portion 61 formed on the head 3 meshes with a rack 1211 formed in the interior of the second case.

Next, the relationship between the first case 11 and the second case 12 will be described with reference to FIGS. 4 and 5.

Figure 4:
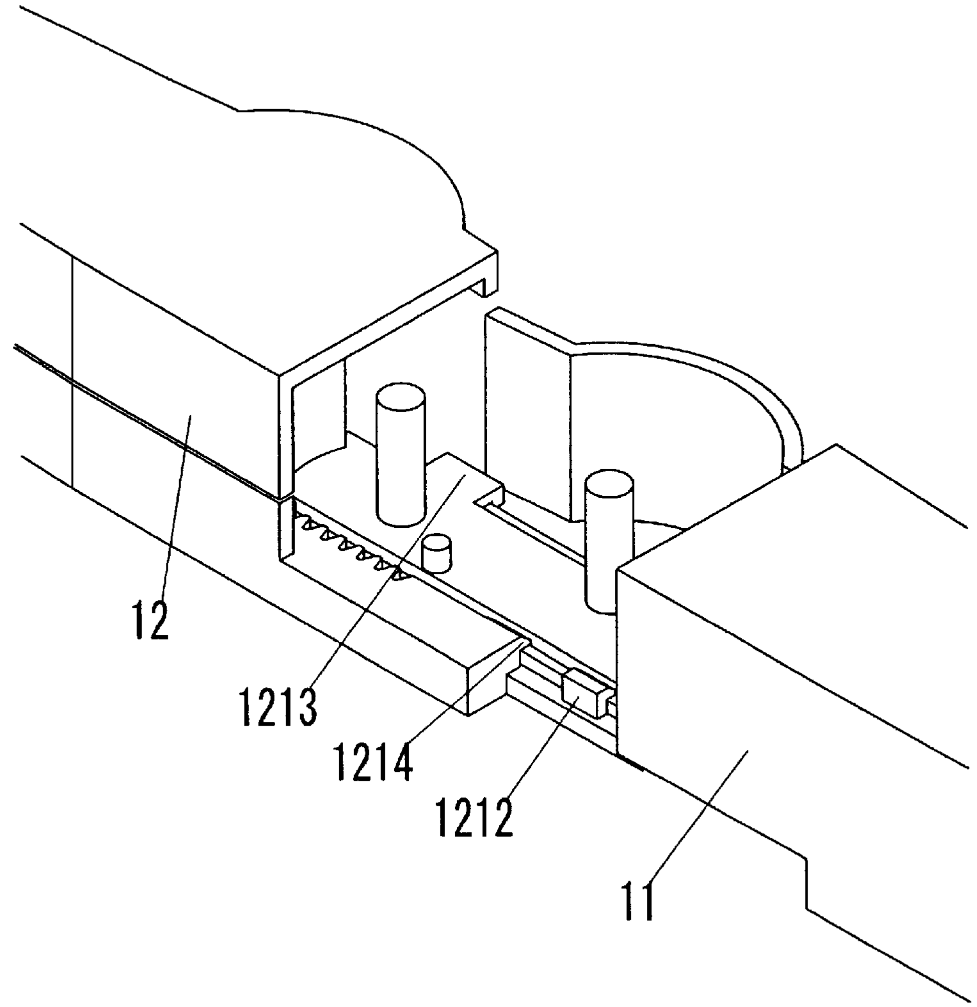
FIG. 4 is a perspective view showing a state in which the first case engages with the second case.

FIG. 4 shows a state in which the first case 11 and the second case 12 are coupled to each other.

Figure 5:
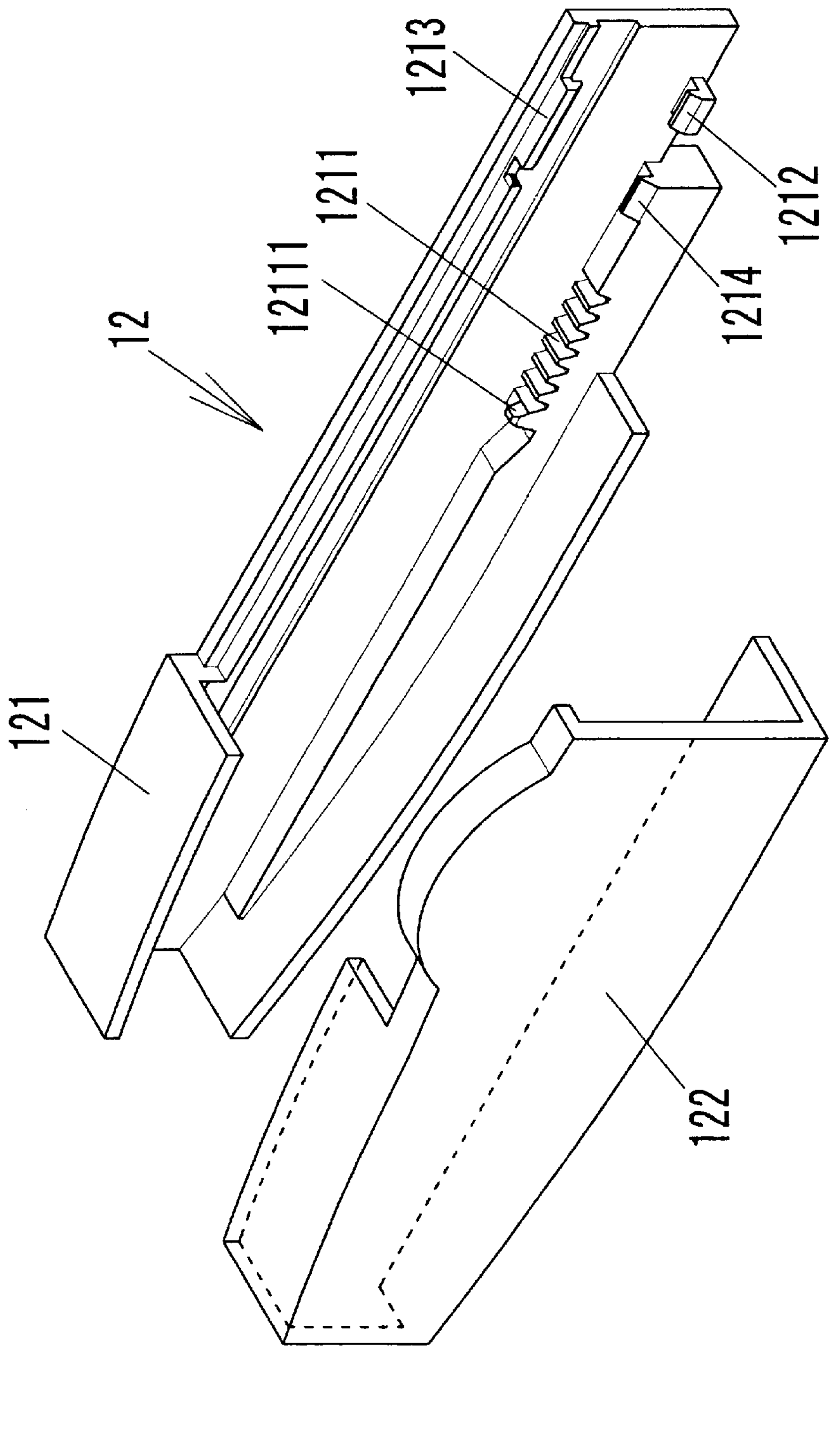
FIG. 5 is a perspective view showing the construction of the second case.

FIG. 5 is an exploded perspective view showing the construction of the second case 12.

The first case 11 is integrally molded from resin, and the second case 12 is constituted by a left-hand member 121 and a right-hand member 122, which are both molded from resin. The first case 11 is coupled to the second case 12 by means of three members which are locking pawls 1212, 1213, 1214 provided on the second case 12, whereby one of the cases can be slid easily relative to the other case to open the main body when a coating film transfer tapes replacement operation is carried out. Note that when coupling the respective cases together an engagement portion 116 (refer to FIG. 7) formed on the back of the first case 11 fits in a guide portion 1215 formed on an internal surface of the second case. In addition, a locking portion 117 (refer to FIG. 7) formed on the first case 11 is locked by the locking pawl 1214.

Next, referring to FIGS. 6 to 9, respective members mounted on the first case 11 will be described.

Figure 6:
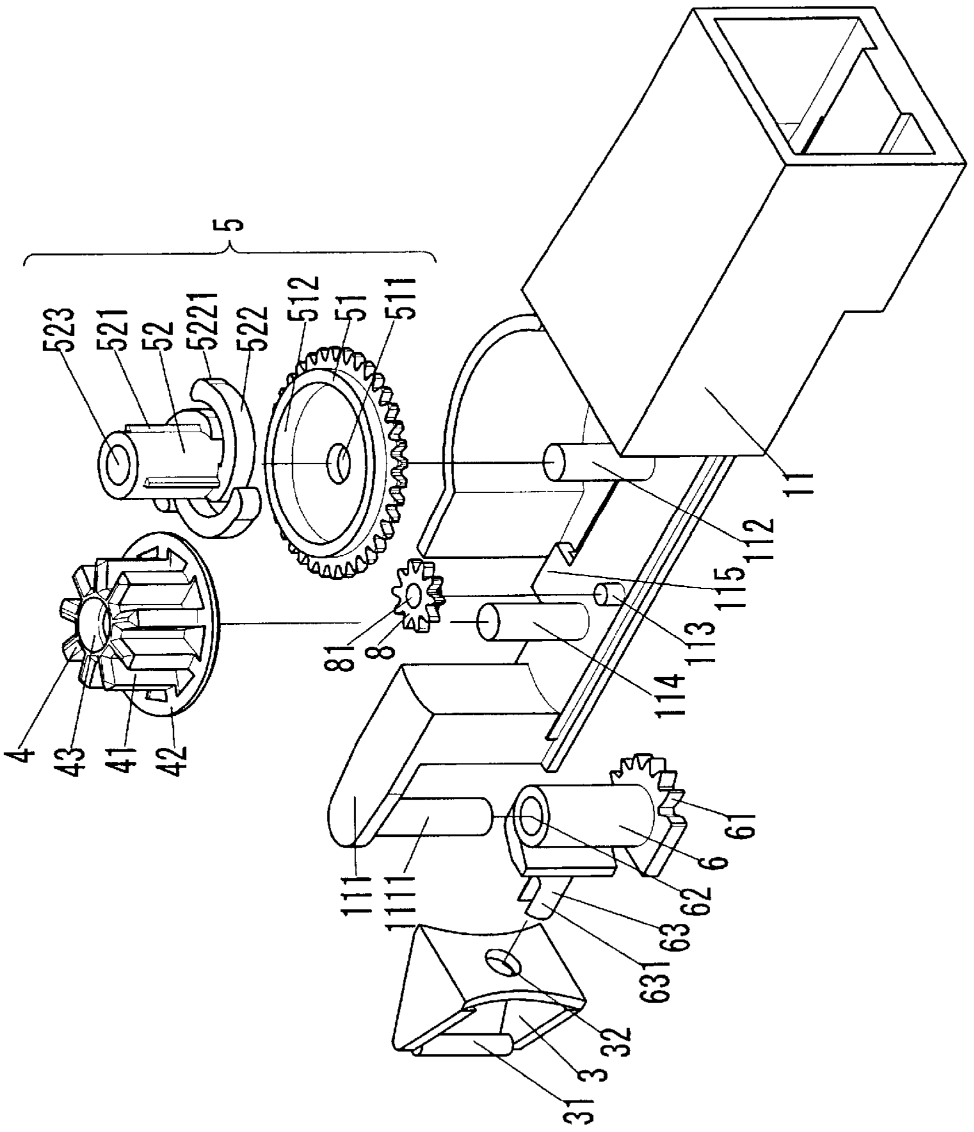
FIG. 6 is an exploded perspective view showing a mechanism provided on the second case.

FIG. 6 is an exploded perspective view showing the positional relationship between respective members which are mounted on the first case 11.

Figure 7:
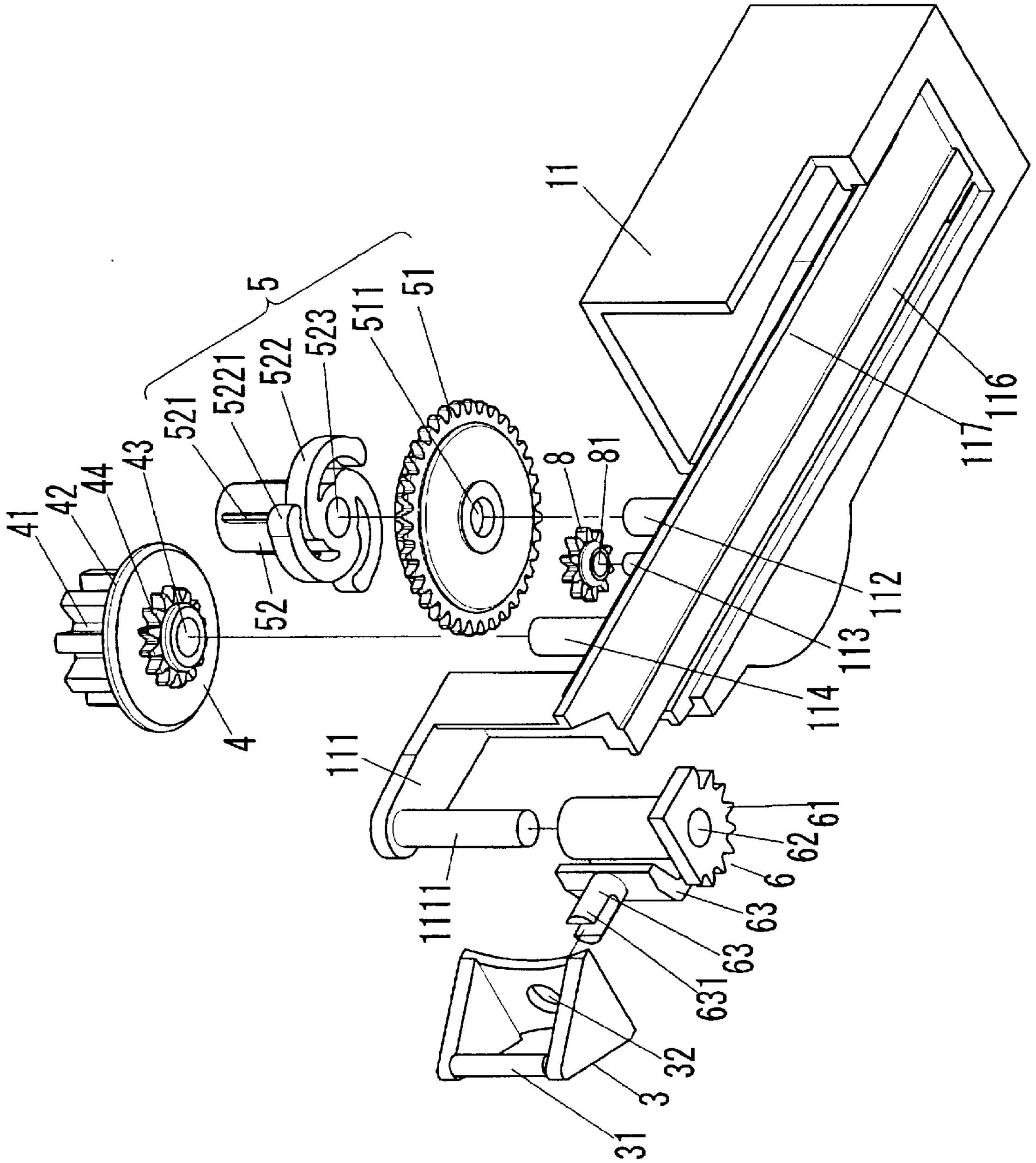
FIG. 7 is a diagram in which the exploded perspective view shown in FIG. 6 is viewed at a different angle.

FIG. 7 shows a state of the exploded perspective view shown in FIG. 6 as viewed from therebelow.

Figure 8:
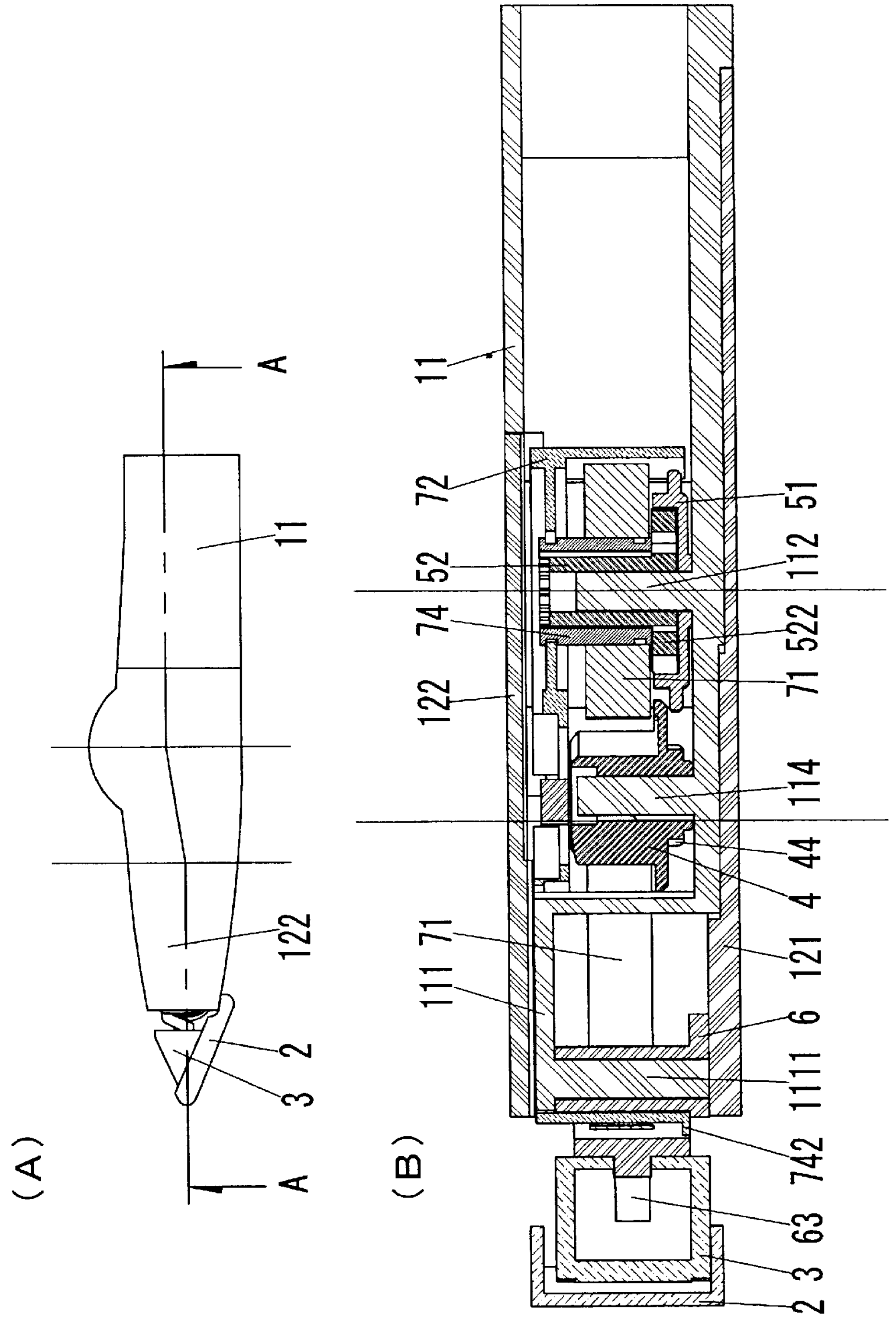
FIG. 8A is a side view of the main body.
FIG. 8B is a horizontal cross-sectional view taken along the line A—A which shows the internal construction of the main body shown in FIG. 1.

FIG. 8 is a horizontal cross-sectional view of the main body 1 taken along the line A—A.

Figure 9:
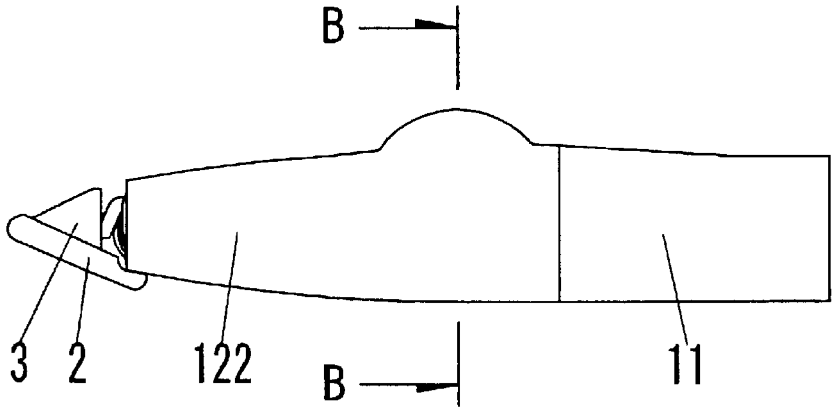
FIG. 9A is a side view of the main body.
FIG. 9B is a vertical cross-sectional view taken along the line B—B which shows the internal construction of the main body shown in FIG. 1.
Figure 9:
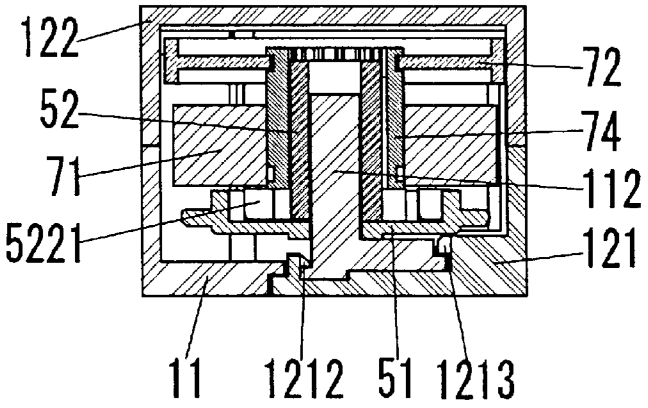

FIG. 9 is a vertical cross-sectional view of the main body 1 taken along the line B—B.

The supply reel 5 is constituted by a gear member 51 and a rotating core 52 which are both molded from resin material and is loosely fitted on a shaft 112 formed in the first case 11. Then, when assembling them together, arms 522 provided on the rotating core 52 are placed inside a rim formed on an upper surface of the gear member 51, and projections 5221 formed at distal end portions of the arms 522 are brought into contact with an inner wall 512 of the rim to thereby constitute a friction clutch. In addition, shaft holes 523 and 511 are formed in centers of the rotating core 52 and the gear member 51, respectively, and the shaft 112 is loosely inserted into these holes for free rotation.

The middle gear 8 is integrally molded from resin material and is mounted on a shaft 113 in such a manner that the shaft 113 is loosely inserted in a hole 81 formed therein. Note that the middle gear 8 meshes with the gear member 51 of the supply reel 5 when the middle gear 8 is mounted on the shaft 113.

The take-up reel 4 is integrally formed from resin material and is mounted on a shaft 114 in such a manner that the shaft 114 is loosely inserted in a shaft hole 43. Then, the take-up reel 4 becomes rotatable in a state in which it is mounted on the shaft 114, and in this state, a gear portion 44 formed at a lower portion of the take-up reel 4 meshes with the middle gear 8. In addition, the take-up reel 4 comprises a locking portion 41 and an edge portion 42. As will be described later, the locking portion 41 is provided for locking tape locking pieces provided on a coating film transfer tape. In addition, the edge portion 42 is provided for restricting the vertical movements of the gear member 51 so as to prevent the dislocation of the gear member 51 from the shaft.

The head retaining body 6 is integrally molded from resin material and is mounted on a head mounting portion 111 in such a manner that a shaft 1111 provided on the head mounting portion 111 is loosely inserted into a shaft hole 62 formed in the head retaining body 6 for rotation. In addition, the head 3 is mounted on a shaft 63 formed on a shock absorbing member 64 provided on the head retaining body 6. The head 3 comprises a roller 31 and is rotatably mounted on the shaft 63 in such a manner that the shaft 63 is loosely inserted in a hole 32 formed in a rear portion of the head 3. A distal end 631 of the shaft 63 is formed into a split shape which is elastically deformed when forces are applied thereto from the left and right sides thereof. Thus, the head 3 is mounted on the shaft 63 by pressing the distal end 631 from the left and right sides thereof so as to reduce the gap in the shaft 63 and releasing the forces applied to the distal end 631 from the left and right sides thereof after the shaft 63 has passed through the hole 32 formed in the head 3. Then, the distal end 631 of the shaft 63 expands wider than the inside diameter of the hole 32 whereby the head 3 is locked onto the shaft 63.

Next, referring to FIGS. 10 to 14, the operation of the head 3 and the head retaining body 6 of the coating film transfer tool according to the invention will be described.

Figure 10:
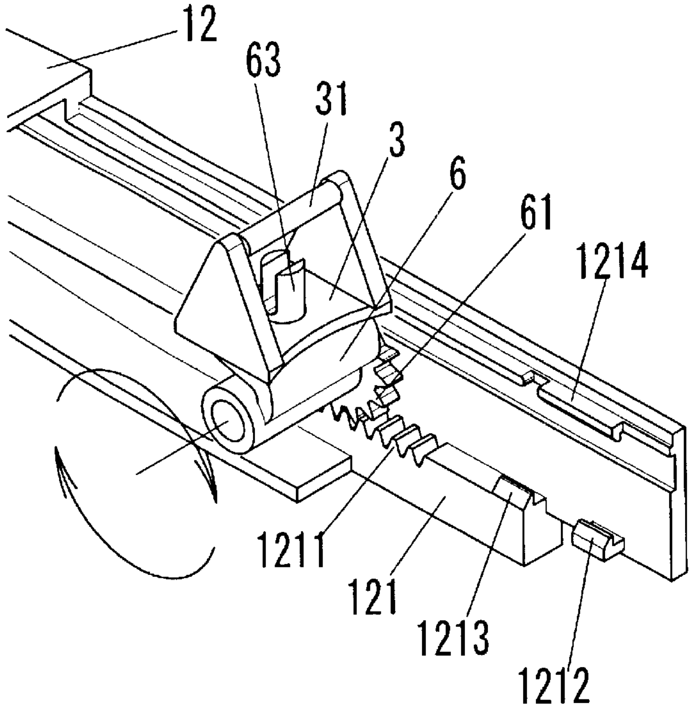
FIG. 10 is a perspective view showing a state in which a gear portion provided on a head retaining body meshes with a rack provided in the interior of the second case.

FIG. 10 is a diagram explaining a meshing condition of the head retaining body 6 and the rack 1211 formed in the interior of the second case 12, and in the figure only members are shown which are needed for explanation and other members are omitted as a matter of convenience.

The head retaining body 6 meshes with the rack 1211 as shown in the figure, and FIGS. 11 to 14 show in the order of time series states of mesh engagement of the members that change with time sequentially. In addition, as with FIG. 10, in the respective figures only members are shown which are needed for the explanation and other member are omitted as a matter of convenience.

Figure 11:
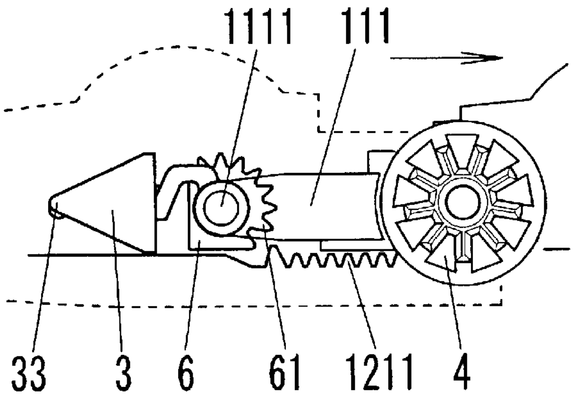
FIG. 11 is a diagram explaining the operation of the head retaining body.

Firstly, the head 3 is oriented horizontally as shown in FIG. 11. The first case 11 is caused to slide to the right from that state.

Figure 12:
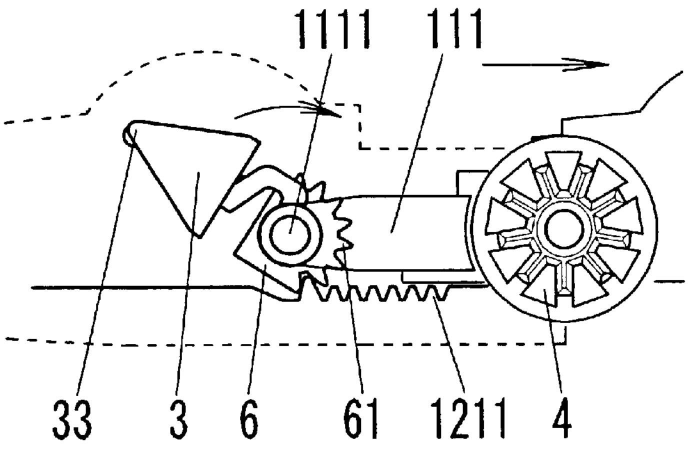
FIG. 12 is a diagram explaining the operation of the head retaining body.

Then, as shown in FIG. 12, a projection 12111 provided at a distal end of the rack 1211 is brought into contact with a distal end of a gear portion 61 formed on the head retaining body 6 and the head retaining body 6 starts to rotate in the clockwise direction.

Figure 13:
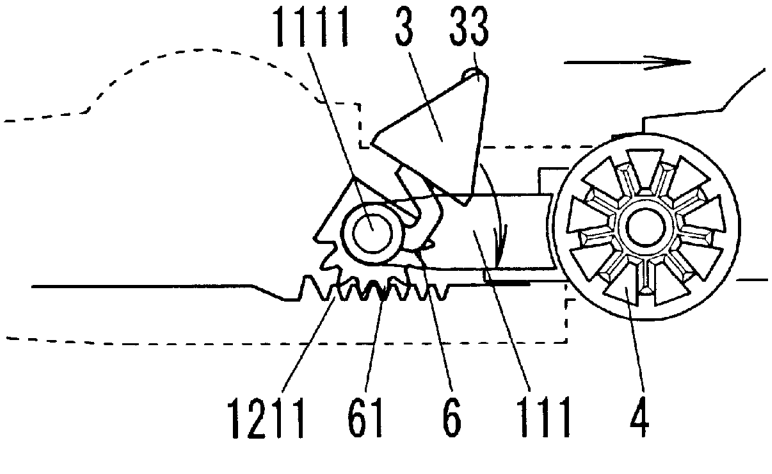
FIG. 13 is a diagram explaining the operation of the head retaining body.
Figure 14:
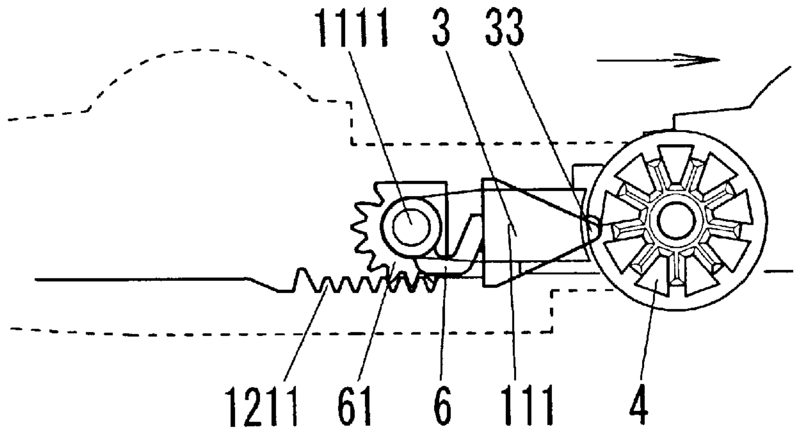
FIG. 14 is a diagram explaining the operation of the head retaining body.

Then, a state shown in FIG. 14 is reached via a state shown in FIG. 13. As this occurs, the head retaining body 6 and the head 3 are in a state in which they have rotated through 180 degrees from the state shown in FIG. 11, and a rotating shaft 1111 of the head retaining body 6, an end portion 33 of the head 3 and a rotating shaft 114 of the take-up reel 4 are put in a state in which they are linearly aligned with one another.

What has been described heretofore is the operation of the head 3 and the head retaining body 6, and when the case is closed the aforesaid operation is reversed. Namely, the head 3 and the head retaining body 6 rotate through 180 degrees in the counterclockwise direction to be put in the state shown in FIG. 11.

Next, referring to FIGS. 15 to 17, described below will be the construction of a replacement coating film transfer tape (a refill) 7 for use in the coating film transfer tool according to the invention.

Figure 15:
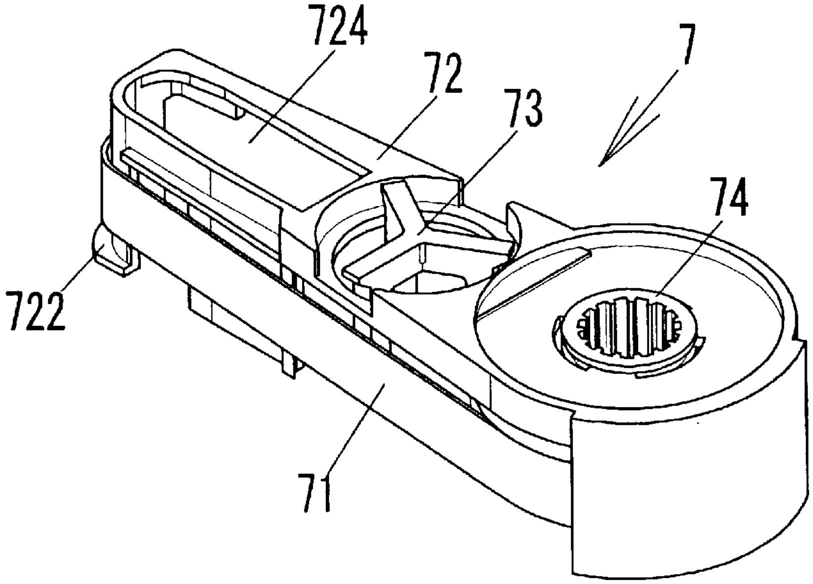
FIG. 15 is a diagram showing a construction for a replacement coating film transfer tape for use with the invention.

FIG. 15 shows the external appearance of the replacement coating film transfer tape according to the invention.

Figure 16:
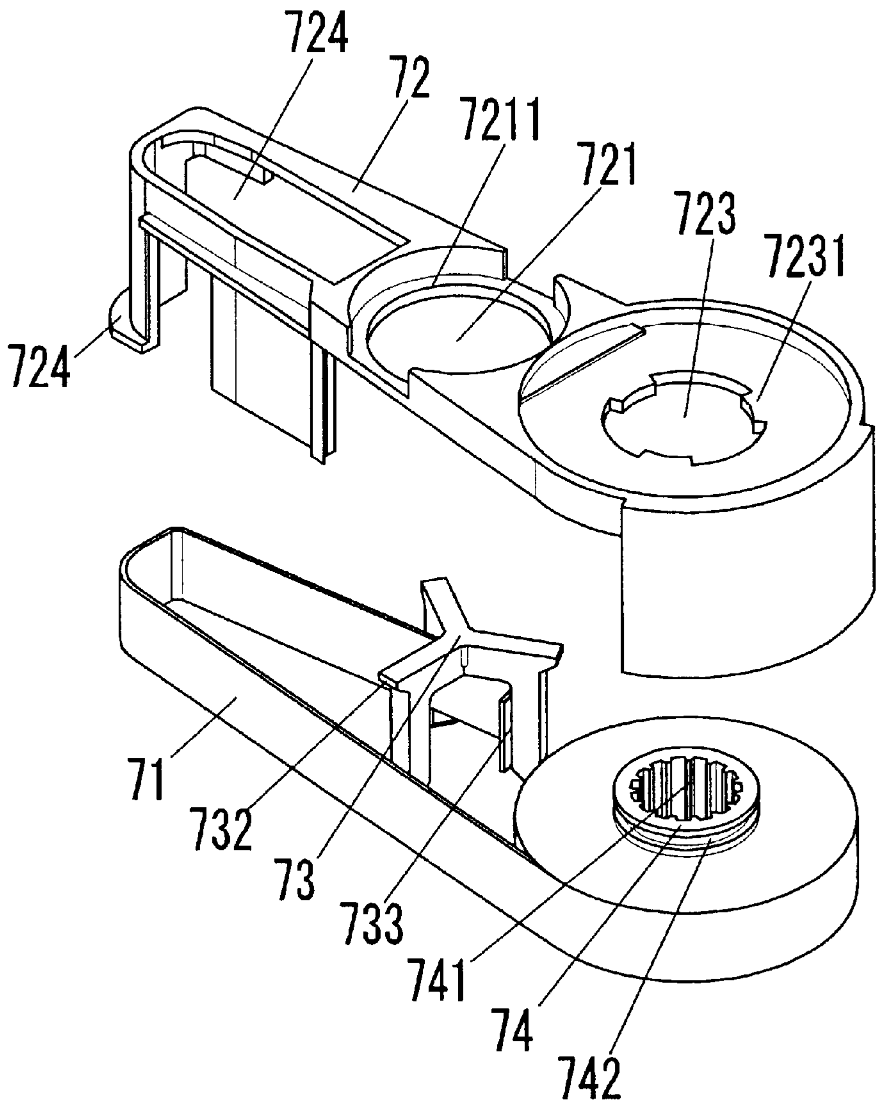
FIG. 16 is an exploded perspective view showing the construction of the replacement coating film transfer tape shown in FIG. 15.

FIG. 16 is an exploded perspective view of the coating film transfer tape shown in FIG. 15.

Figure 17:
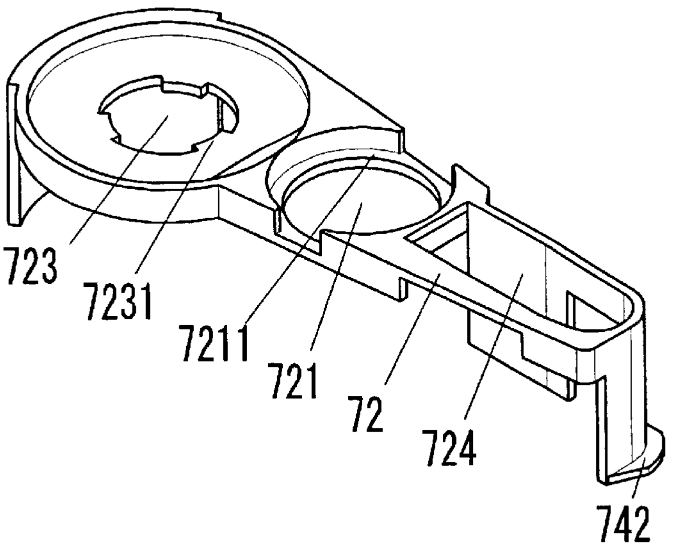
FIG. 17 is a diagram showing a retaining body shown in FIG. 16 as viewed at a different angle.

FIG. 17 is a perspective view of a retaining body 72 shown in FIG. 16 as viewed from a different angle.

The replacement coating film transfer tape 7 comprises a retaining body 72 molded from resin and a coating film transfer tape 71 on which a core 74 and a tape locking piece 73 are provided, the coating film transfer tape 71 being mounted on the retaining body 72. The coating film transfer tape 71 is locked on a guide portion 722 in this state.

A tape locking piece mounting portion 721 and a core mounting portion 723 are provided in the retaining body 72. An edge portion 7211 is provided on the tape locking piece mounting portion 721, and a plurality of locking pieces 7231 are provided on an edge portion of the core mounting portion 723. In addition, the coating film transfer tape 71 is formed in such a manner that an end portion of a tape taken up around the core 74 is attached to an inner wall 733 of the tape locking piece 73. In this tape locking piece 73, when mounted an engagement portion 732 provided at an upper portion of the tape locking piece 73 is locked onto the edge portion 7211 of the mounting portion 721 formed in the retaining body 72. In addition, a locking portion 742 formed on the outer circumference of the core 74 is locked by a locking piece 7231 formed on the core mounting portion 723 for free rotation. Note that a plurality of projections 741 are formed on an internal surface of the core 74, and when mounted the plurality of projections 741 are brought into engagement with idle rotation preventing pawls 521 provided on the supply reel 5 so that the idle rotation of the coating film transfer tape can be prevented. In addition, as shown in FIG. 17, the back of the retaining body 72 is notched such that the coating film transfer tape is pulled out therefrom.

Next, referring to FIGS. 18 and 19, the mounting relationship between the take-up reel 4 and the tape locking piece 73 will be described.

Figure 18:
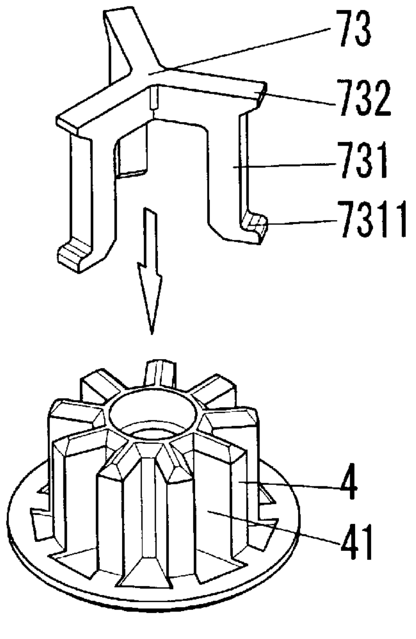
FIG. 18 is a perspective view showing the positional relationship between a tape locking piece 73 and a take-up reel 4 when assembling them together.

FIG. 18 shows a state in which the tape locking piece 73 is about to be mounted on the take-up reel 4.

Figure 19:
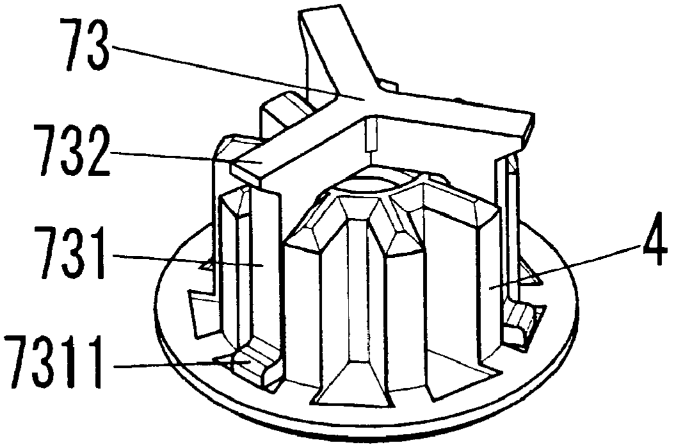
FIG. 19 is a diagram showing a state in which the tape locking piece 73 is mounted on the take-up reel 4.

FIG. 19 shows a state in which the tape locking piece 73 is mounted on the take-up reel 4.

Three leg portions 731 are formed on the tape locking piece 73. In addition, a plurality of locking portions 41 are formed on the take-up reel 4. The three leg portions 731 formed on the tape locking piece 73 are inserted into the locking portion 41 from thereabove to be locked in place. Lower ends 7311 of the leg portions 731 protrude from the leg portions 731 such that a used up coating film transfer tape taken up around the take-up reel can be locked in such a manner as to be removed integrally with the locking piece 73 when the used up coating film transfer tape is removed.

Next, referring to FIGS. 20 and 21, the replacement of coating film transfer tapes 7 will be described.

Figure 20:
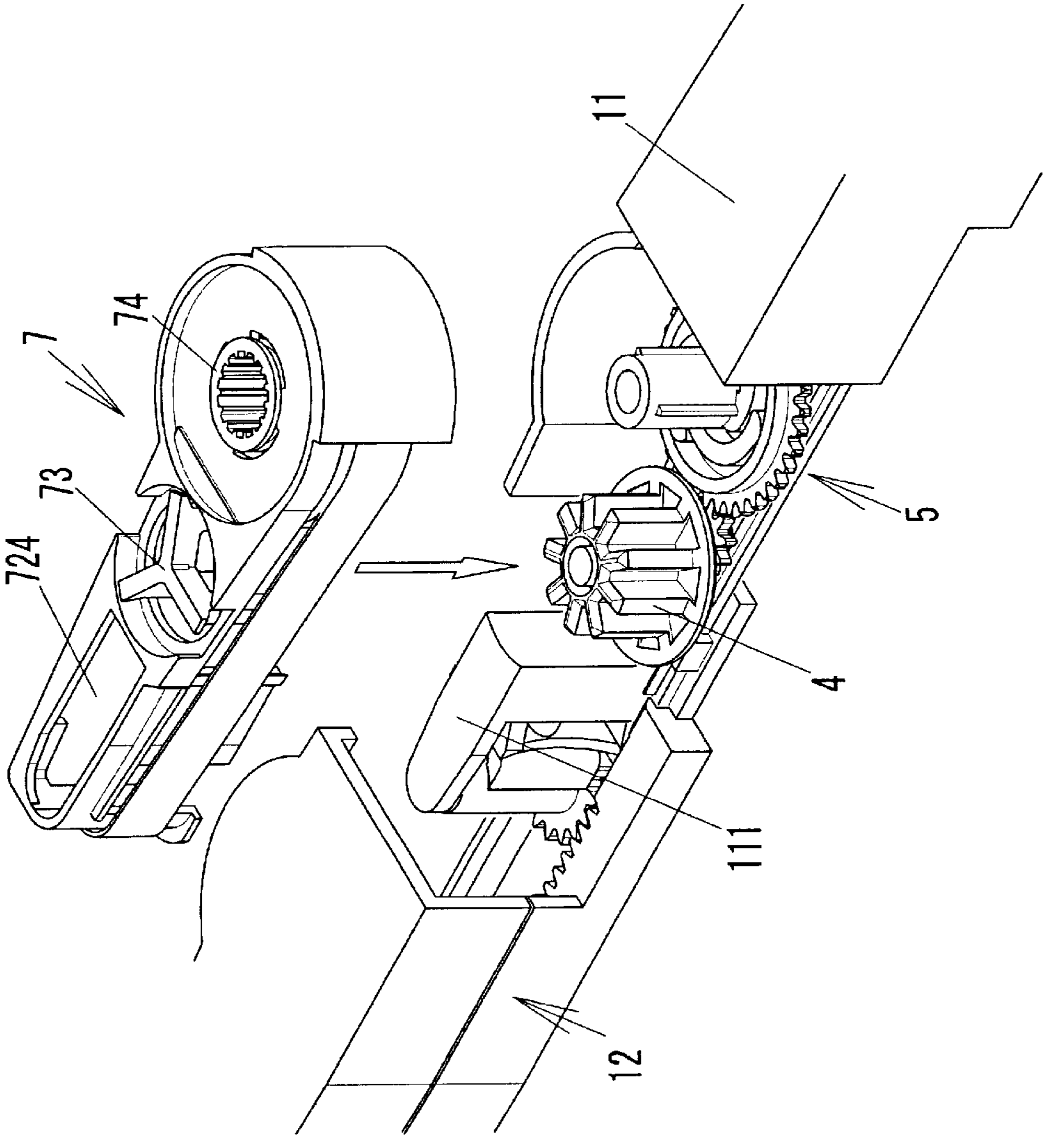
FIG. 20 is a diagram explaining the replacement work of coating film transfer tapes.

FIG. 20 shows a state in which a replacement tape is about to be mounted on the coating film transfer tool according to the invention.

In replacing coating film transfer tapes, firstly, the main body 1 is opened to remove the used up coating film transfer tape, and thereafter a new coating film transfer tape 7 is mounted. As this occurs, the new coating film transfer tape 7 is positioned for mounting such that the locking piece 73 of the replacement coating film transfer tape 7 fits in the take-up reel 4 and that core 74 of the coating film transfer tape fits on the supply reel 5. Then, a state shown in FIG. 21 is attained, in which state an opening 724 formed in the retaining body 72 is aligned with the head mounting portion 111.

Figure 21:
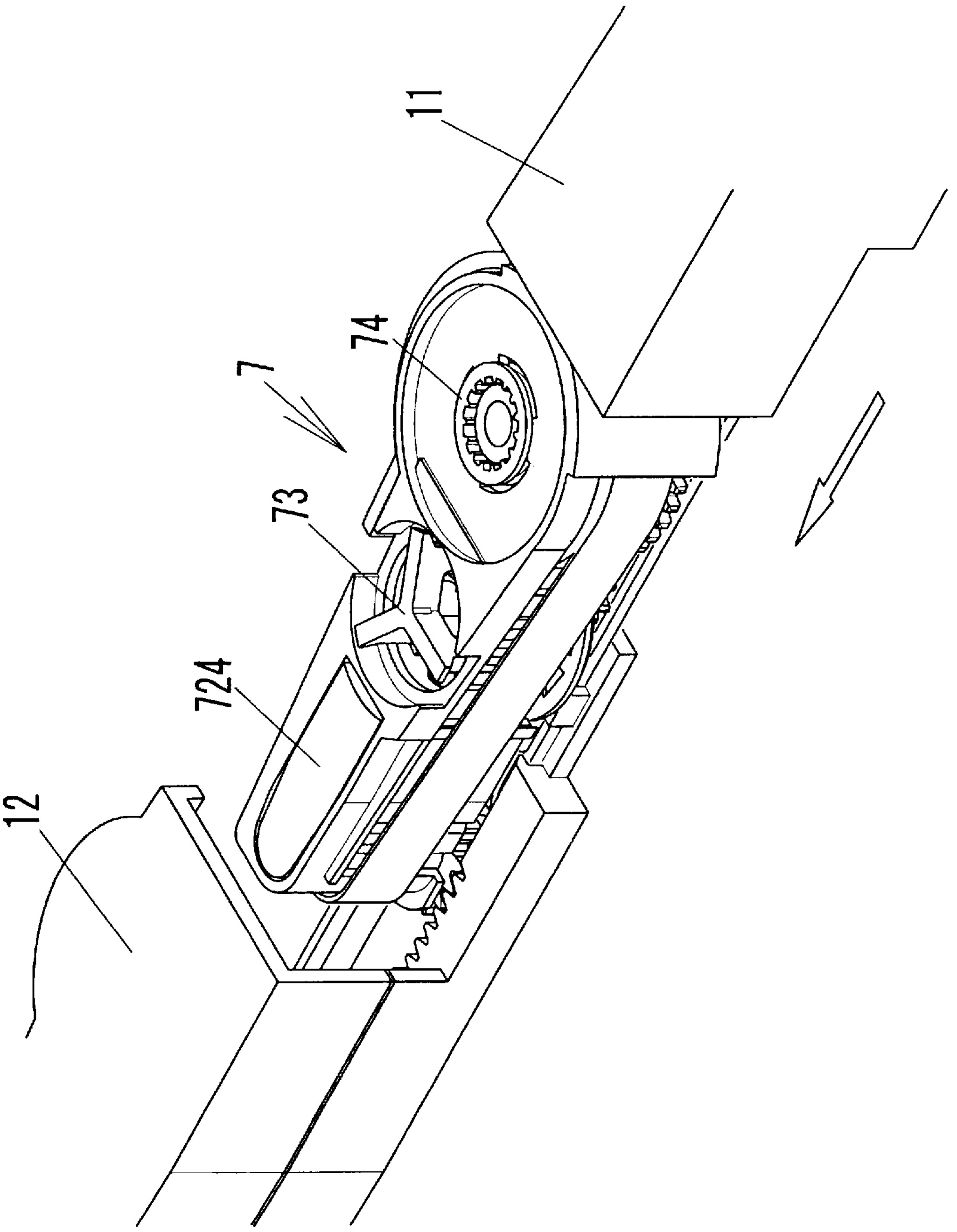
FIG. 21 is a diagram explaining the replacement work of coating film transfer tapes.

FIG. 21 shows a state in which the replacement coating film transfer tape is mounted on the supply reel and the take-up reel with the proper positional relationship. Thereafter, the first case 11 is slid to the left to close the case, whereby the replacement of the coating film transfer tapes is completed.

Next, referring to FIGS. 22 to 25, the operation of the respective members when replacing coating film transfer tapes will be described.

Figure 22:
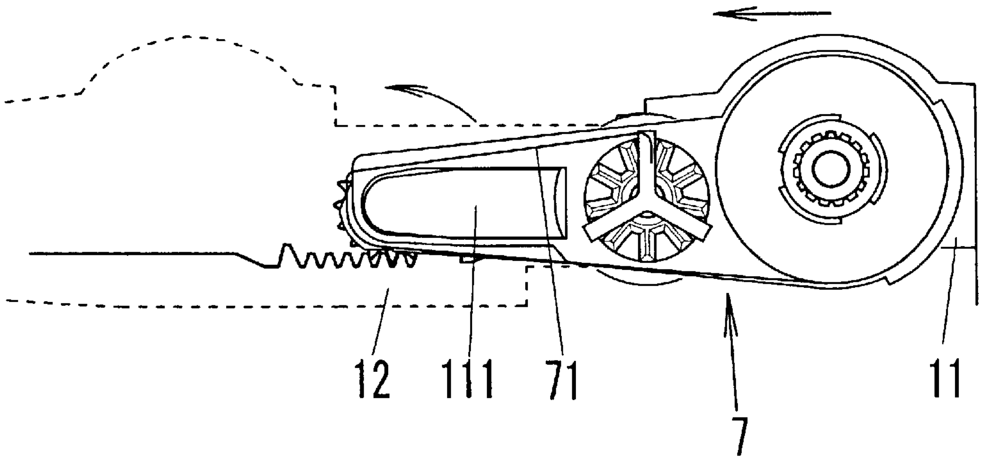
FIG. 22 is a diagram showing the operation of respective members when replacing coating film transfer tapes.

FIGS. 22 to 25 show in the order of time series operations of the respective members when replacing coating film transfer tapes, and in a state shown in FIG. 22, a coating film transfer tape has been in mounted in the coating film transfer tool. Note that FIG. 22 corresponds to the state shown in FIG. 21. In each figure, with a view to making clear the operation of the coating film transfer tape 71, the coating film transfer tape 71 is described in solid lines irrespective of the locations thereof.

Figure 23:
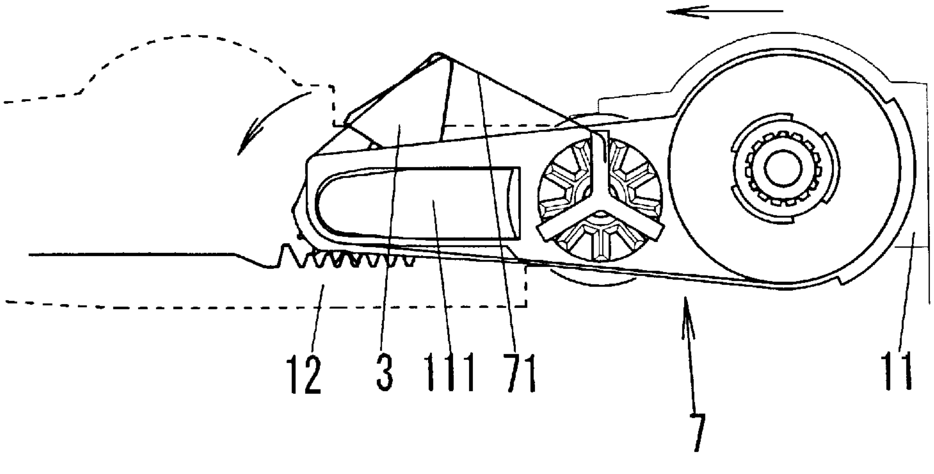
FIG. 23 is a diagram showing the operation of the respective members when coating film transfer tapes are replaced.
Figure 24:
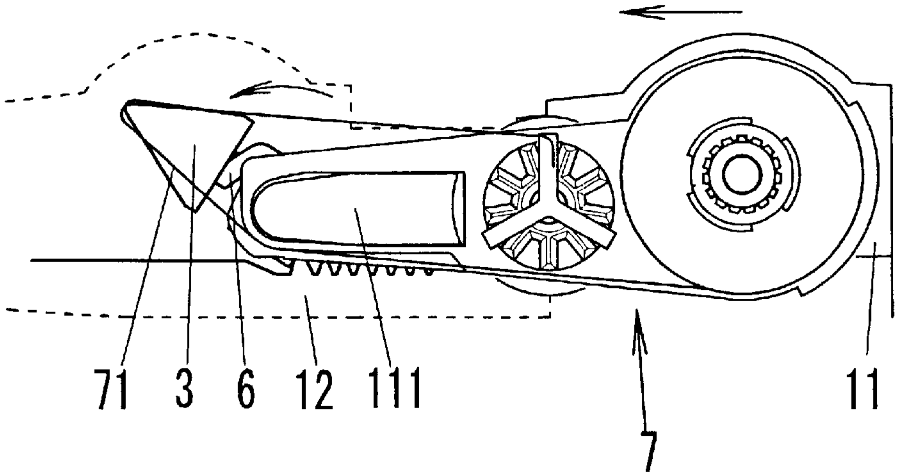
FIG. 24 is a diagram showing the operation of the respective members when coating film transfer tapes are replaced.
Figure 25:
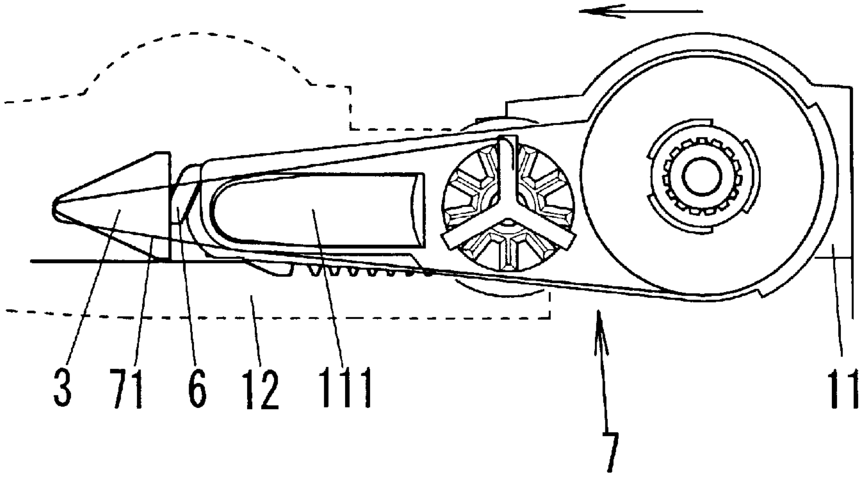
FIG. 25 is a diagram showing the operation of the respective members when coating film transfer tapes are replaced.

When the first case 11 is caused to slide the head 3 and the head retaining body 6 rotate counterclockwise, resulting in a state shown in FIG. 23. As this occurs, the coating film transfer tape 71 is automatically hooked on the head 3 through the rotation of the head 3 and is pulled out of the supply reel. Then, the head 3 continues to rotate further as the first case 11 moves, and a state shown in FIG. 25 is attained via a state shown in FIG. 24.

In this state, the slack on the coating film transfer tape has already been eliminated. In addition, the position of the head has returned to the position before the first case was moved.

Next, referring to FIG. 26, a state will be described in which the coating film transfer tool according to the invention is used.

Figure 26:
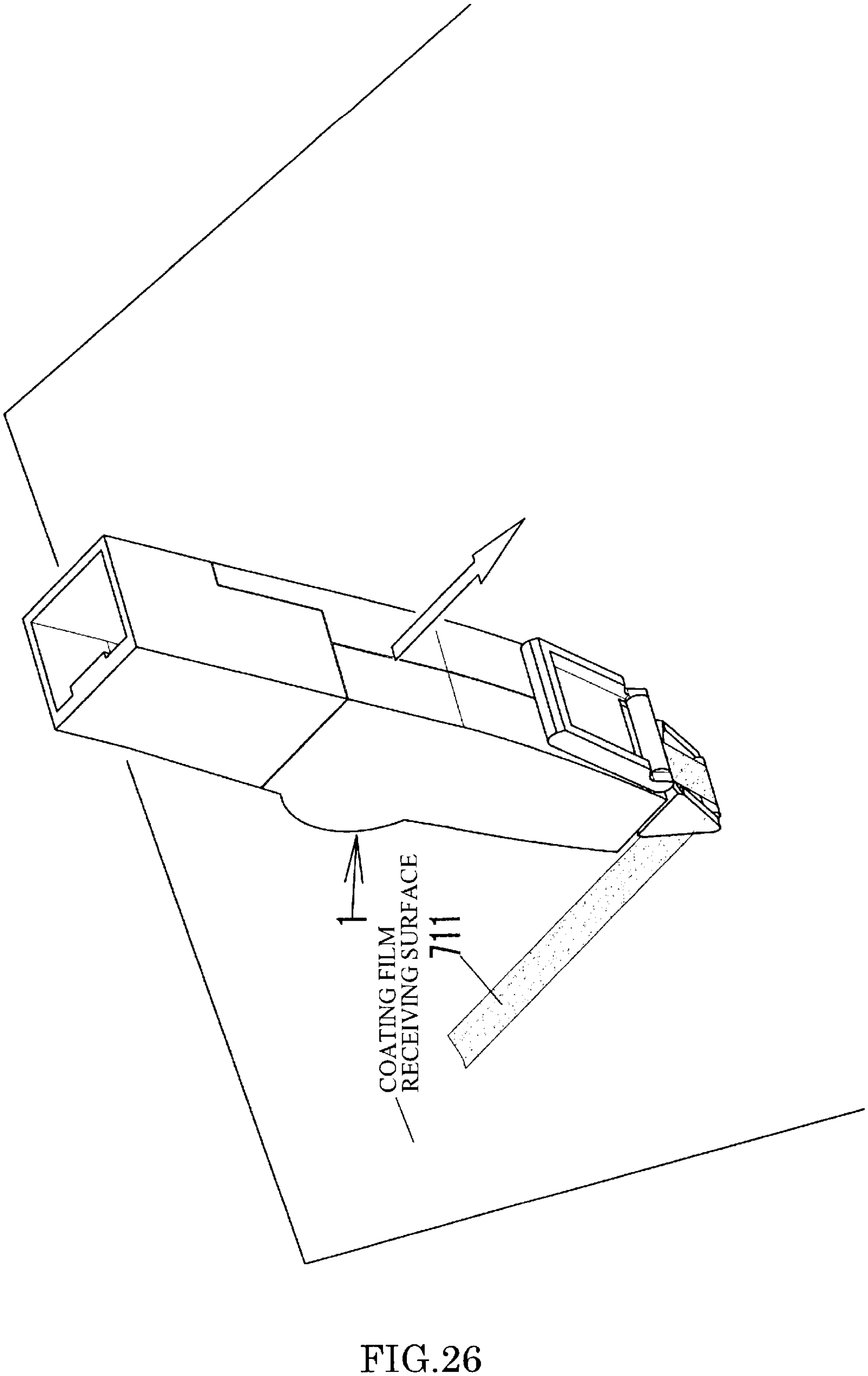
FIG. 26 is a perspective view showing a state in which the coating film transfer tool according to the invention is used.
Figure 27:
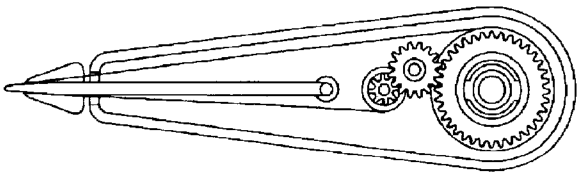
FIG. 27 is a diagram showing the construction of a conventional coating film transfer tool.
Figure 28:
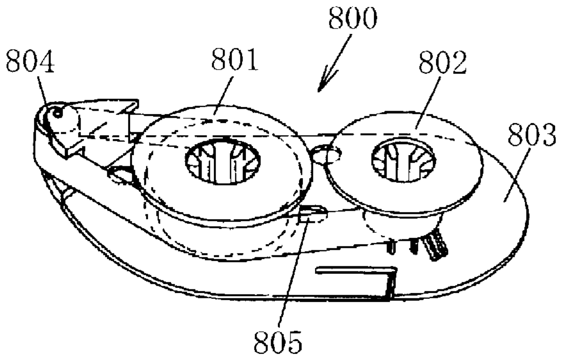
FIG. 28 is a diagram showing a replacement cartridge for use in the conventional coating film transfer tool.
Figure 29:
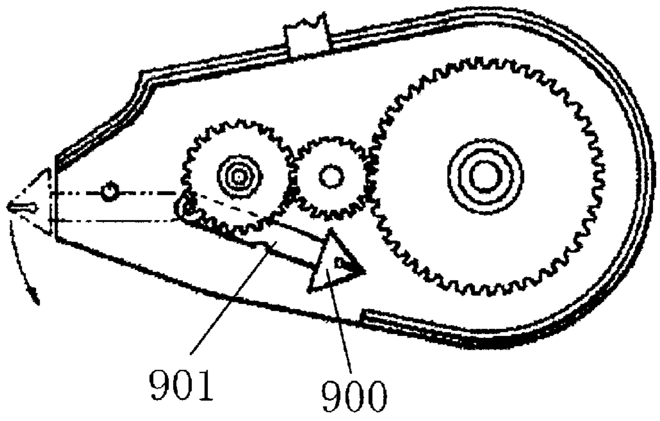
FIG. 29 is a diagram showing the construction of a conventional head rotatable coating film transfer tool.
Figure 30:
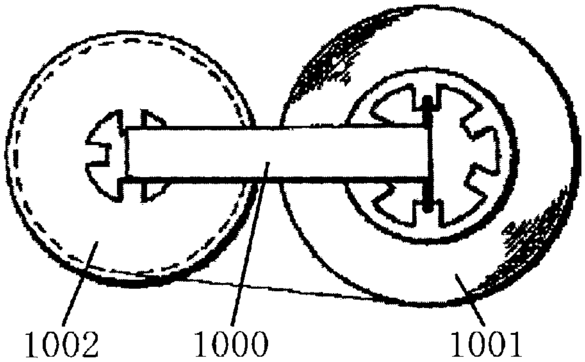
FIG. 30 is a diagram showing the construction of a replacement coating film transfer tape for use in the coating film transfer tool shown in FIG. 29.
Figure 31:
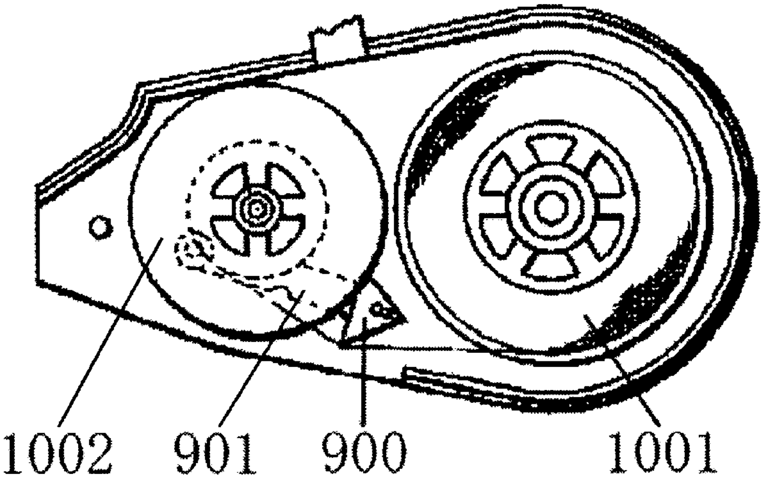
FIG. 31 is a diagram explaining replacement work of coating film transfer tapes in the coating film transfer tool shown in FIG. 29.

FIG. 26 shows a state in which the coating film transfer tool is used. When using the coating film transfer tool the main body 1 is held by the hand, and after the cap 2 is removed the coating film transfer tool is moved with the head being pressed against the coating film receiving surface such as the surface of a piece of paper. Then, the coating film is transferred to the coating film receiving surface. Thus, the coating film transfer tool according to the invention is used as has been described heretofore. Note that the coating film transfer tool according to the invention is a mechanism that can be applied to a wide range of applications including a tape glue, a correction tape and a marker, and the coating film transfer tool may be applied to any of the applications.

According to the invention, when the main body is divided to be opened for supply of the refill for replacement the head automatically rotates to the tape replacement position, whereas when the main body is closed after the replacement with the refill has been completed the tape is automatically taken up to be wrapped around the distal end portion of the head whereby transfer work becomes possible. As a result, the troublesome work that has been carried out manually in the conventional techniques can be eliminated and the replacement work of coating film transfer tapes can be implemented extremely easily. In addition, in replacing coating film transfer tapes, the members that are provided on the main body such as the head, the take-up reel and the supply reel do not have to be replaced but can continue to be used, thereby making it possible to provide the coating film transfer tool that can contribute to the conservation of resources and reduction in the amount of wastes to be discharged.

In addition, according to the invention, since the head retaining body is allowed to rotate through mesh engagement between the rack formed in one of the constituent members of the main body and the gear portion formed on the head retaining body, the coating film transfer tool can be provided which is constructed such that when the main body is divided to be opened in replacing with a refill, the head automatically rotates to the tape replacing position, whereas when the main body is closed after the replacement with the refill was successfully completed the tape is automatically taken up to be wrapped on the distal end portion of the head. Consequently, the respective members provided in the interior of the main body do not have to be moved individually, thereby making it possible to provide the coating film transfer tool in which the replacement work of coating film transfer tapes can be implemented extremely easily.

According to the invention, when the main body is divided to be opened in supplying the refill for replacement, the head retaining body rotates and, the head automatically moves to the side of the take-up reel so as to be disengaged from the coating film transfer tape. In addition, when the divided main body is closed the head retaining body automatically rotates in the reverse direction whereby the tape is hooked on the head, and the coating film transfer tape is then drawn out to eliminate the slack on the tape. Consequently, the respective members provided in the interior of the main body do not have to be moved individually, thereby making it possible to provide the coating film transfer tool in which the replacement work of coating film transfer tapes can be implemented extremely easily.

According to the invention, when the main body is divided to be opened for supply of the refill for replacement the head automatically rotates the tape replacement position whereas when the main body is closed after the replacement with the refill has been completed the tape is automatically taken up to be wrapped around the distal end portion of the head whereby the transfer work becomes possible. Consequently, the replacement of coating film transfer tapes can be implemented simply through the operations of dividing the main body to open it for removing the used up coating film transfer tape, mounting the refill coating film transfer tape on the supply reel and the take-up reel after the used up coating film transfer tape has been removed and closing the divided main body.

What is claimed is:

1. A coating film transfer tool for use to transfer a transfer layer provided on a side of a tape in a strippable state to a coating film receiving surface, said coating film transfer tool being characterized in that a head automatically rotates to a tape replacement position when a main body is divided to be opened for supply of a refill for replacement, and in that a coating film transfer tape is automatically taken up to be wrapped around a distal end portion of said head whereby transfer work becomes possible when said main body is closed after the replacement with said refill has been completed.

2. A coating film transfer tool as set forth in claim 1, wherein a gear portion is provided which is adapted to mesh with a rack provided on one of main body members constituting said main body, and wherein a head retaining body is provided in the interior of the other main body member in such a manner as to be rotatably supported.

3. A coating film transfer tool as set forth in claim 1, wherein said head retaining body automatically moves to a side of a take-up reel so that said coating film transfer tape is disengaged from said head when said main body is divided to be opened for supply of a refill for replacement whereas said head retaining body automatically rotates in a reverse direction so that said coating film transfer tape is engaged with said head when said divided main body is closed, and wherein said coating film transfer tape is drawn out as said head retaining body so rotates, whereby the slack of said coating film transfer tape is removed.

4. A method for replacing coating film transfer tapes for use in a coating film transfer tool for use to transfer a transfer layer provided on a side of a tape in a strippable state to a coating film receiving surface, said coating film transfer tool being constructed such that a head automatically rotates to a tape replacement position when a main body is divided to be opened for supply of a refill for replacement and that a coating film transfer tape is automatically taken up to be wrapped around a distal end portion of said head whereby transfer work becomes possible when said main body is closed after the replacement with said refill has been completed, said method comprising the operations of dividing said main body to open it for removing a coating film transfer tape that has been used up, mounting a refill coating film transfer tape on a supply reel and a take-up reel after said used-up coating film transfer tape has been removed, and closing said divided main body.

5. A coating film transfer tool as set forth in claim 2, wherein said head retaining body automatically moves to a side of a take-up reel so that said coating film transfer tape is disengaged from said head when said main body is divided to be opened for supply of a refill for replacement whereas said head retaining body automatically rotates in a reverse direction so that said coating film transfer tape is engaged with said head when said divided wain body is closed, and wherein said coating film transfer tape is drawn out as said head retaining body so rotates, whereby the slack of said coating film transfer tape is removed.

* * * * *